(12) United States Patent
Cha et al.

(10) Patent No.: US 11,036,297 B2
(45) Date of Patent: Jun. 15, 2021

(54) TACTILE FEEDBACK DEVICE

(71) Applicants: KOREA INSTITUTE OF SCIENCE AND TECHNOLOGY, Seoul (KR); CENTER OF HUMAN-CENTERED INTERACTION FOR COEXISTENCE, Seoul (KR)

(72) Inventors: Youngsu Cha, Seoul (KR); Kahye Song, Seoul (KR); Jung Min Park, Seoul (KR); Bum-Jae You, Seoul (KR)

(73) Assignees: Korea Institute of Science and Technology, Seoul (KR); Center of Human-Centered Interaction for Coexistence, fence Seoul (KR)

( * ) Notice: Subject to any disclaimer, the term of this patent is extended or adjusted under 35 U.S.C. 154(b) by 0 days.

(21) Appl. No.: 16/502,253

(22) Filed: Jul. 3, 2019

(65) Prior Publication Data
US 2020/0019246 A1 Jan. 16, 2020

(30) Foreign Application Priority Data
Jul. 12, 2018 (KR) .......................... 10-2018-0080970

(51) Int. Cl.
*G06F 3/01* (2006.01)
*G08B 6/00* (2006.01)

(52) U.S. Cl.
CPC .............. *G06F 3/016* (2013.01); *G08B 6/00* (2013.01)

(58) Field of Classification Search
CPC .................................. G06F 3/016; G08B 6/00
USPC ........................................... 340/407.1, 407.2
See application file for complete search history.

(56) References Cited

U.S. PATENT DOCUMENTS

| | | | |
|---|---|---|---|
| 5,659,171 A * | 8/1997 | Young ................... | H01J 49/288 250/281 |
| 8,222,799 B2 | 7/2012 | Polyakov et al. | |
| 8,760,413 B2 * | 6/2014 | Peterson ................. | G06F 3/016 200/600 |
| 9,430,106 B1 * | 8/2016 | Olsen ...................... | G06F 3/044 |
| 2002/0109009 A1 * | 8/2002 | Sadler ............... | G01N 21/6452 235/454 |
| 2007/0140614 A1 * | 6/2007 | Kim .................... | H01H 59/0009 385/18 |
| 2008/0204909 A1 | 8/2008 | Shiota et al. | |
| 2009/0160813 A1 | 6/2009 | Takashima et al. | |

(Continued)

FOREIGN PATENT DOCUMENTS

| | | |
|---|---|---|
| JP | 2014-052993 A | 3/2014 |
| KR | 10-2009-0068130 A | 6/2009 |

(Continued)

OTHER PUBLICATIONS

E. Acome et al., "Hydraulically amplified self-healing electrostatic actuators with muscle-like performance", Science, Jan. 5, 2018, pp. 61-65, vol. 359.

*Primary Examiner* — Daryl C Pope
(74) *Attorney, Agent, or Firm* — Rabin & Berdo, P.C.

(57) ABSTRACT

Provided is a tactile feedback device including a tactile transmission element having an enclosed space inside, the tactile transmission element including a compression part which is compressed toward the enclosed space by an electrostatic force generated by the application of voltage, and a tactile part which transmits tactile sensation to a user by expansion with movement of air by the compression.

10 Claims, 5 Drawing Sheets

(56) References Cited

U.S. PATENT DOCUMENTS

| | | | |
|---|---|---|---|
| 2012/0313874 A1* | 12/2012 | Chappaz | H01L 41/0805 |
| | | | 345/173 |
| 2015/0205368 A1* | 7/2015 | Yairi | G06F 3/046 |
| | | | 345/173 |
| 2015/0227201 A1 | 8/2015 | Nakao | |
| 2016/0239806 A1* | 8/2016 | Benham | G06Q 10/1053 |
| 2017/0148281 A1* | 5/2017 | Do | G09B 21/004 |
| 2017/0249811 A1* | 8/2017 | Do | G06F 3/016 |
| 2018/0120942 A1* | 5/2018 | Lee | G02F 1/133305 |
| 2018/0129286 A1 | 5/2018 | Kim et al. | |
| 2018/0326456 A1* | 11/2018 | Park | G01L 1/146 |
| 2019/0020288 A1* | 1/2019 | Makinen | H01H 59/0009 |
| 2020/0185592 A1* | 6/2020 | Spann | H01L 41/0913 |

FOREIGN PATENT DOCUMENTS

| | | |
|---|---|---|
| KR | 10-0927638 B1 | 11/2009 |
| KR | 10-2010-0136983 A | 12/2010 |
| KR | 10-2014-0136446 A | 12/2010 |
| KR | 10-2015-0096624 A | 8/2015 |
| KR | 10-1554289 B1 | 9/2015 |
| KR | 10-2016-0040149 A | 4/2016 |
| KR | 10-1841365 B1 | 3/2018 |
| WO | WO 2009/123769 A1 | 10/2009 |

* cited by examiner

TACTILE FEEDBACK DEVICE

CROSS-REFERENCE TO RELATED APPLICATION

This application claims priority to Korean Patent Application No. 10-2018-0080970, filed on Jul. 12, 2018, and all the benefits accruing therefrom under 35 U.S.C. § 119, the contents of which in its entirety are herein incorporated by reference.

STATEMENT REGARDING SPONSORED RESEARCH

This research is made with support for the global frontier support (R&D) program (Development of hand-based seamless CoUI for collaboration between remote users, Project serial number: 1711073470) in the National Research Foundation of Korea, the Ministry of Science and ICT of the Republic of Korea, under the supervision of Korean Institute of Science and Technology.

BACKGROUND

1. Field

The present disclosure relates to a tactile feedback device, and more particularly, to a tactile feedback device for providing tactile feedback through the structure change using an electrostatic force.

2. Description of the Related Art

Haptics is a tactile and force feedback technology that takes advantage of a user's sense of touch by applying the haptic feedback effect (i.e., "haptic effect") such as forces, vibrations, and motions to the user. Additionally, kinesthetic feedback and tactile feedback are collectively known as the haptic effect. The haptic effect may be useful in providing a realistic feeling of feedback to provide cues to alert the user of specific events, or enhance sensory experiences.

As an example of the haptic feedback effect, tactile feedback technology is technology that feeds back tactile sensory information to the user. The known tactile feedback technique generates tactile signals by modulating electric forces between a finger and a touch screen panel (TSP). Using this technology, various texture sensations such as rough or soft, or sharp or smooth surfaces can be delicately recognized on the touchscreen. For example, in the case of keyboard inputs on the display, the user can feel the contours of the keys on the keyboard, or at the moment of touching wood, the user can recognize the wood texture. It is possible to create and feedback various tactile sensations such as hardness or smoothness, or wetness or roughness like sandpaper.

Most of earlier tactile feedback technologies provide tactile feedback by vibration generated using small motors or piezoelectric devices.

There is a need for development of tactile feedback devices of simpler structure with high efficiency energy use.

SUMMARY

The present disclosure is directed to providing a simple tactile feedback device with high efficiency energy use for providing tactile feedback through the structure change using an electrostatic force.

To solve the above-described problem, a tactile feedback device of the present disclosure includes a tactile transmission element having an enclosed space inside, the tactile transmission element including a compression part which is compressed toward the enclosed space by an electrostatic force generated by the application of voltage, and a tactile part which transmits tactile sensation to a user by expansion with movement of air by the compression.

In an example related to the present disclosure, the compression part may be provided along an edge of the tactile transmission element, and the tactile part may be provided at a center of the tactile transmission element such that the tactile part is connected to the compression part.

The compression part may contain a conductive material, and the tactile part may contain a non-conductive material alone.

The compression part may contain iron oxide ($Fe_3O_4$), and the tactile part may contain silicone.

In another example related to the present disclosure, the tactile feedback device of the present disclosure may further include an electrode part positioned near the tactile transmission element to provide an electrostatic attractive force to the tactile transmission element, and a short prevention part positioned between the tactile transmission element and the electrode part to prevent a short between the tactile transmission element and the electrode part.

The tactile feedback device of the present disclosure may further include a case installed to house the tactile transmission element, the electrode part and the short prevention part.

An end of a central area of the tactile part may be concave.

DETAILED DESCRIPTION

Hereinafter, the disclosed embodiments will be described in detail with reference to the accompanying drawings, and identical or similar elements are given identical or similar reference signs and redundant descriptions are omitted herein. As used herein, the suffix "part" for elements is only given or used to ease the drafting of the specification, and does not have any meaning or role for identifying itself. Additionally, in describing the embodiments disclosed herein, when a certain detailed description of relevant known technology is determined to render the key subject matter of the disclosed embodiments ambiguous, its detailed description is omitted herein. Additionally, the accompanying drawings are provided for an easy understanding of the disclosed embodiments, and the technical spirit disclosed herein is not limited by the accompanying drawings, and it should be understood that the present disclosure covers all modifications, equivalents or alternatives falling in the spirit and scope of the present disclosure.

The terms "first", "second", and the like may be used to describe various elements, but the elements are not limited by the terms. Rather, the terms are used to distinguish one element from another.

It will be further understood that when an element is referred to as being "connected to" another element, it can be directly connected to the other element or intervening elements may be present.

As used herein, the singular forms are intended to include the plural forms as well, unless the context clearly indicates otherwise.

It will be understood that the term "comprises" or "includes" when used in this specification, specifies the presence of stated features, integers, steps, operations, elements, components or groups thereof, but does not preclude the presence or addition of one or more other features, integers, steps, operations, elements, components, or groups thereof.

Figure 1A:
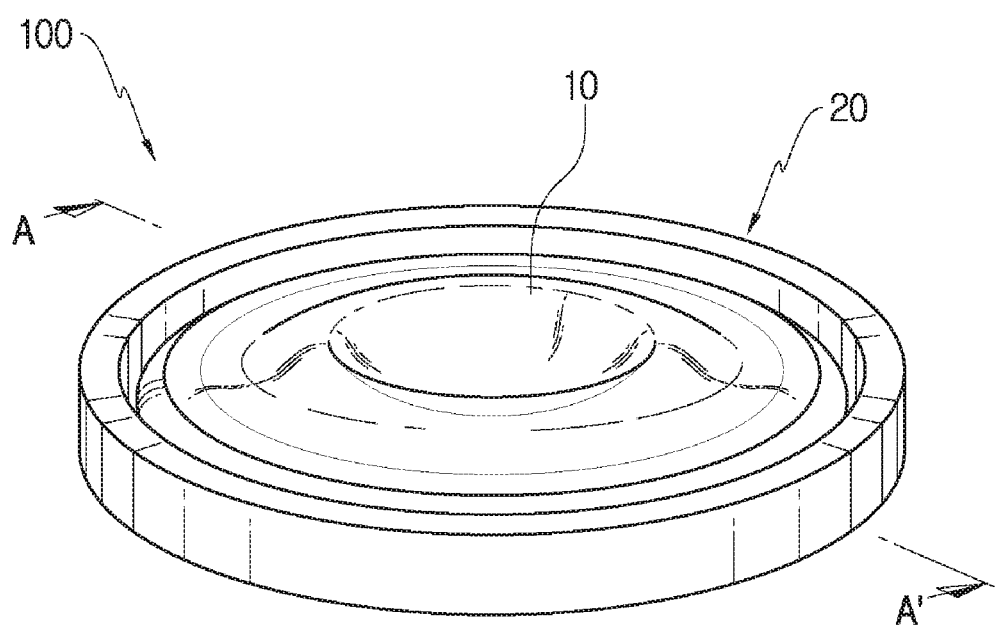
FIG. 1A is a perspective view showing a tactile feedback device of the present disclosure.
Figure 1B:
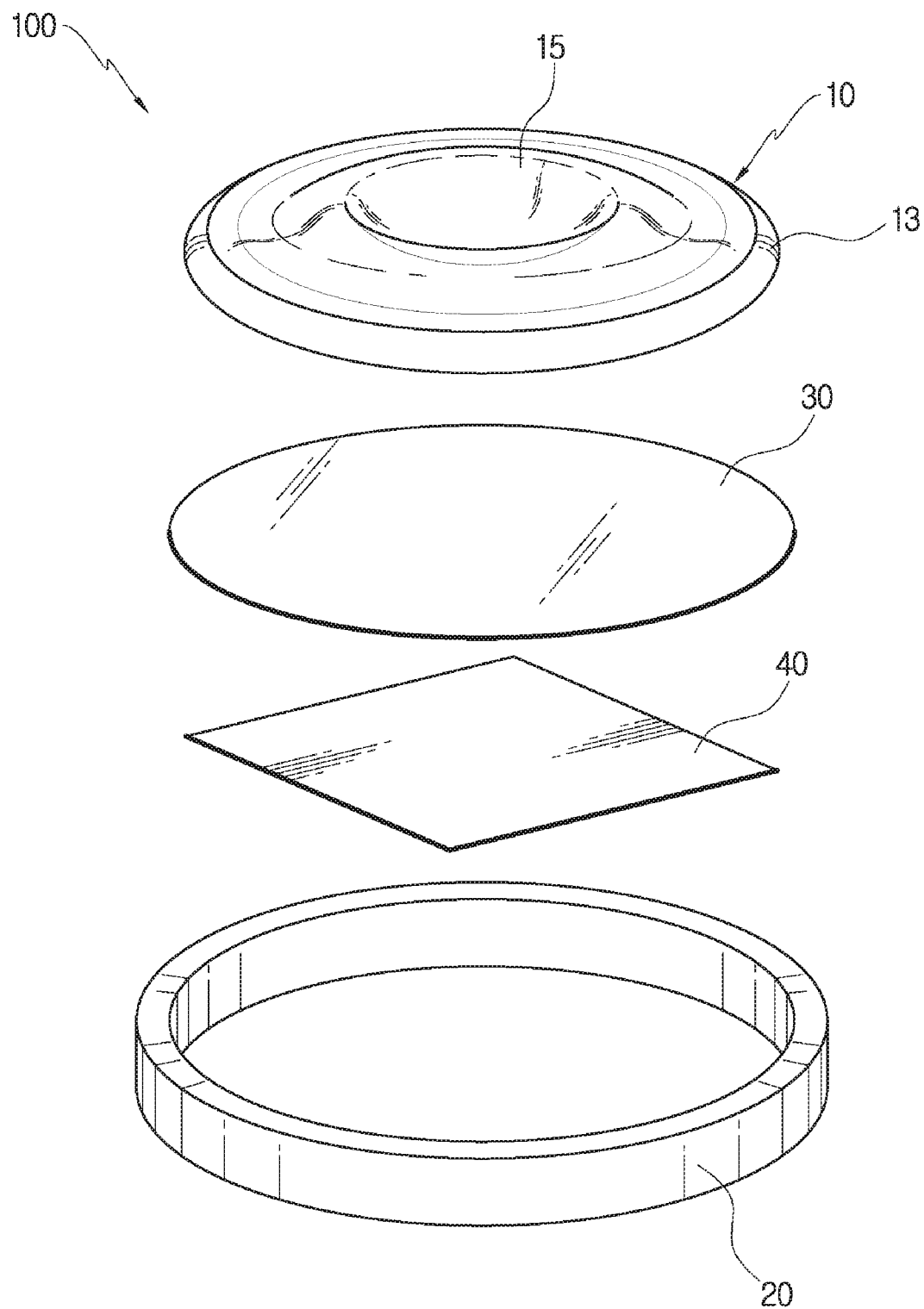
FIG. 1B is an exploded perspective view showing a tactile feedback device of the present disclosure.
Figure 2:
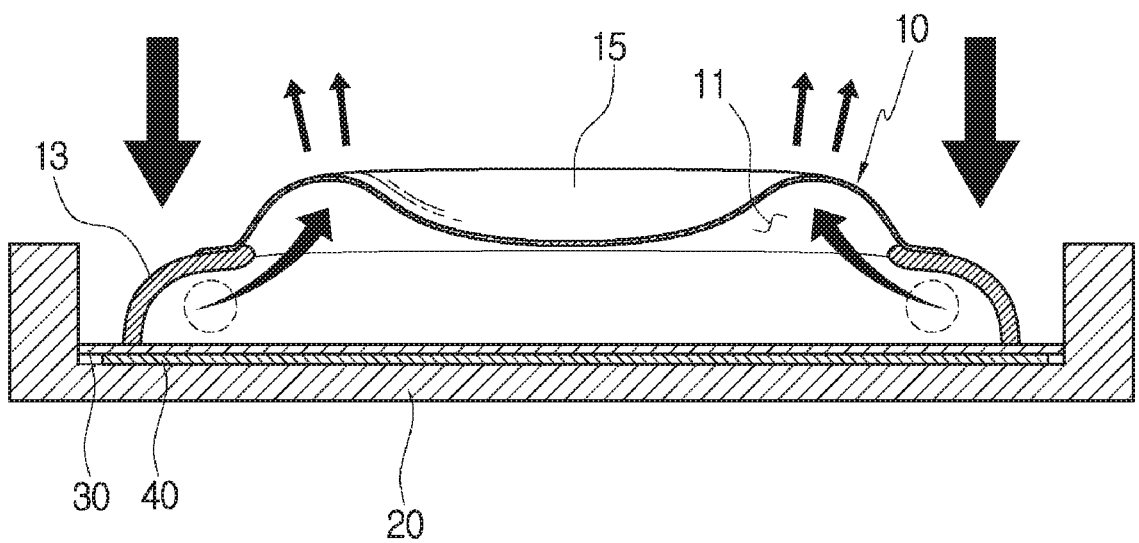
FIG. 2 is a cross-sectional view of FIG. 1A, taken along the line A-A'.

FIG. 1A is a perspective view showing a tactile feedback device 100 of the present disclosure, and FIG. 1B is an exploded perspective view showing the tactile feedback device 100 of the present disclosure. Additionally, FIG. 2 is a cross-sectional view of FIG. 1A, taken along the line A-A'.

The structure of the tactile feedback device 100 of the present disclosure is described with reference to FIGS. 1A to 2.

The tactile feedback device 100 of the present disclosure includes a tactile transmission element 10. The tactile transmission element 10 has an enclosed space 11 inside.

The tactile transmission element 10 includes a compression part 13 and a tactile part 15.

The compression part 13 is configured such that it is compressed toward the enclosed space 11 by an electrostatic force generated by the application of voltage. For example, the compression part 13 may be provided along the edge of the tactile transmission element 10. Referring to FIG. 2, the compression part 13 may be compressed downward by the electrostatic force, and accordingly, air may move along the arrow direction of FIG. 2 within the enclosed space 11.

Although not shown in FIGS. 1B and 2, the compression part 13 may be electrically connected to a power supplier (not shown) that applies power, and may be supplied with the applied voltage.

The tactile part 15 is configured to expand with the movement of air by the compression of the compression part 13, and transmit tactile sensation to a user's finger. For example, when the compression part 13 is compressed by the electrostatic force, air in the enclosed space 11 expands the tactile part 15 outward by applying the pressure to the tactile part 15, and the tactile part 15 transmits tactile sensation to the user's finger. As shown in FIGS. 1A and 1B, the tactile part 15 may be provided at the center of the tactile transmission element 10.

Figure 4A:
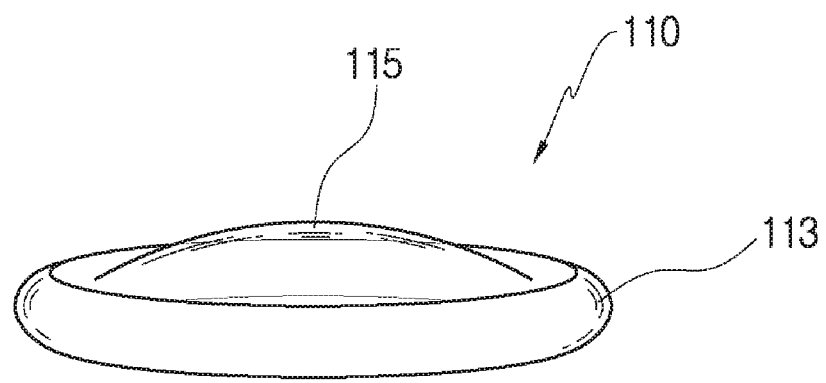
FIG. 4A is a perspective view showing an initial shape of another example of a tactile transmission element of a convex shape.

As shown in FIG. 1B, the tactile transmission element 10 may be formed in a circular shape with the tactile part 15 having a concave central end and the compression part 13 being disposed at the edge, but is not necessarily limited to this structure, and the tactile transmission element 10 may be formed in various shapes such that it has the enclosed space 11 and transmits tactile sensation by the deformation of the tactile part 15 when compressed at the edge, so as to transmit various tactile sensations to the user's finger (a tactile transmission element 110 of a convex shape is shown in FIG. 4A).

The material of the compression part 13 may include a conductive material, and for example, the compression part 13 may be made of silicone including a conductive material such as iron oxide ($Fe_3O_4$). Additionally, the material of the tactile part 15 may include a non-conductive material alone, and for example, the tactile part 15 may be made of silicone.

The tactile part 15 and the compression part 13 may be integrally formed.

By this structure, air in the enclosed space 11 moves through the structure change caused by the compression when the electrostatic force is applied to the compression part 13, then the tactile part 15 is deformed, and tactile sensation is transmitted to the user. FIG. 2 shows an example in which air in the enclosed space 11 deforms the tactile part 15 upward with the movement at the inner periphery of the tactile part 15 by the downward compression of the compression part 13.

The tactile feedback device 100 of the present disclosure may further include a case 20, a short prevention part 30 and an electrode part 40.

The case 20 may be installed to house the tactile transmission element 10, the electrode part 40 and the short prevention part 30. Referring to FIG. 2, an example is shown, in which the case 20 is installed in contact with the electrode part 40 and is installed to house the tactile transmission element 10, the electrode part 40 and the short prevention part 30.

The short prevention part 30 may be positioned between the tactile transmission element 10 and the electrode part 40 to prevent a short between the tactile transmission element 10 and the electrode part 40. The short prevention part 30 may be, for example, a PET film.

The electrode part 40 may be positioned near the tactile transmission element 10 to provide an electrostatic attractive force to the tactile transmission element 10. The electrode part 40 may be, for example, a copper tape.

The electrode part 40 may be electrically connected to the power supplier (not shown) that applies power and may be supplied with the applied voltage. The electrode part 40 may be configured to allow the current of opposite polarity to the compression part 13 to flow to generate an attractive force between the electrode part 40 and the compression part 13.

Figure 3A:
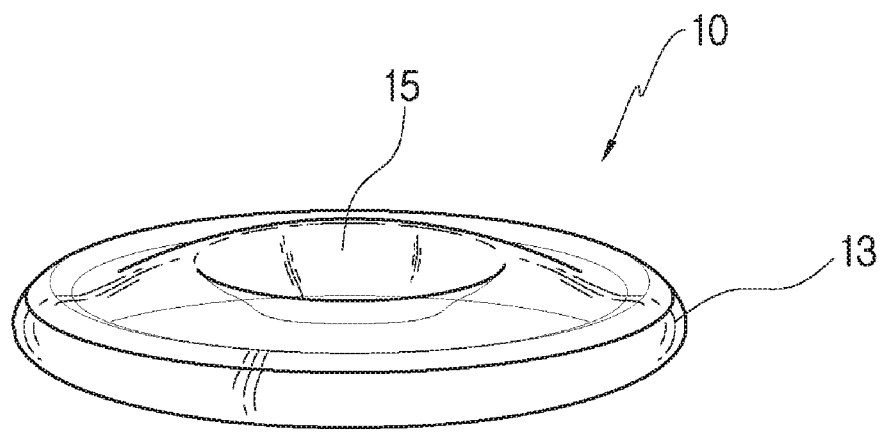
FIG. 3A is a perspective view showing an initial shape of a tactile transmission element of a concave shape.
Figure 3B:
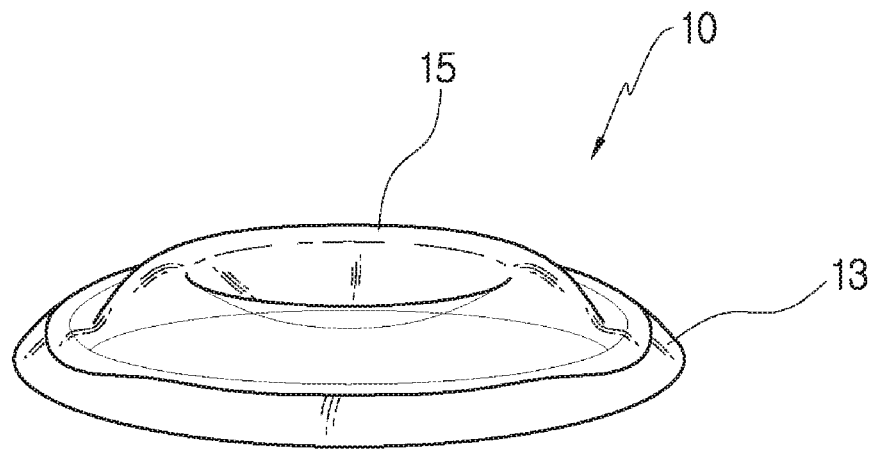
FIG. 3B is a perspective view showing a deformed shape of the tactile transmission element of FIG. 3A.

FIG. 3A is a perspective view showing an initial shape of an example of the tactile transmission element 10 of a concave shape, and FIG. 3B is a perspective view showing a deformed shape of the tactile transmission element 10 of FIG. 3A.

Referring to FIG. 3A, the central end of the tactile part 15 of the tactile transmission element 10 is concave, and FIG. 3B shows an example in which the tactile part 15 is deformed upward by the compression of the compression part as described above.

Figure 4B:
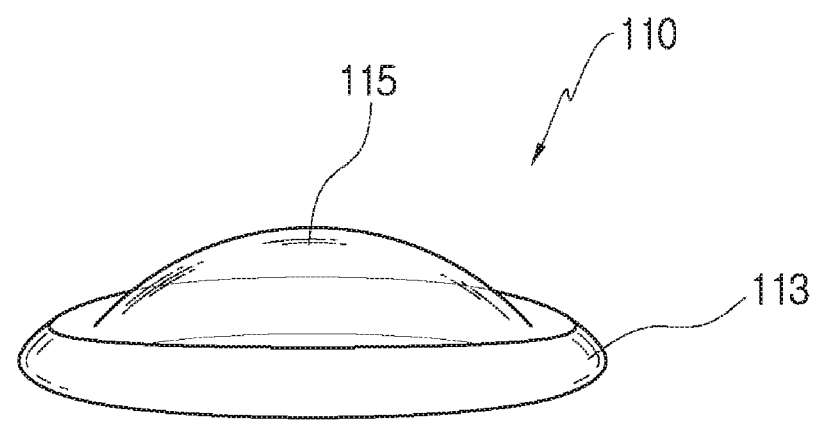
FIG. 4B is a perspective view showing a deformed shape of the tactile transmission element of FIG. 4A.

FIG. 4A is a perspective view showing an initial shape of another example of the tactile transmission element 110 of a convex shape, and FIG. 4B is a perspective view showing a deformed shape of the tactile transmission element 110 of FIG. 4A.

Referring to FIG. 4A, the central end of the tactile part 115 of the tactile transmission element 110 is convex, and FIG. 4B shows an example in which by the compression of the compression part 113, the tactile part 115 is deformed so that it protrudes further upward.

The tactile feedback device 100 of the present disclosure can be used in a variety of vibration generating device applications. Additionally, the tactile feedback device 100 of the present disclosure can be used as actuators of small devices.

The present disclosure can induce an electrostatic attractive force without separately installing electrodes by using a conductive material, and is safe because a contact area with the user is made of a non-conductive material.

Additionally, the present disclosure induces the expansion of a non-conducting structure by the volume contraction of a conducting structure, and when voltage is interrupted, can restore to the original shape with no additional energy due to elasticity of the material.

The tactile feedback device 100 described hereinabove is not limited to the configuration and method of the embodiments described above, and all or some of the embodiments may be selectively combined to make various modification.

It is obvious to those skilled in the art that the present disclosure may be embodied in other particular forms without departing from the spirit and essential features of the present disclosure. Therefore, the detailed description should not be interpreted as being limiting in all aspects and should be considered as being exemplary. The scope of the present disclosure should be determined by the reasonable interpretation of the appended claims, and the scope of the present disclosure covers all modifications within the equivalent scope of the present disclosure.

What is claimed is:

1. A tactile feedback device comprising:
   a tactile transmission element having an enclosed space inside, the tactile transmission element comprising:
   a compression part which is compressed toward the enclosed space by an electrostatic force generated by the application of voltage; and
   a tactile part which transmits tactile sensation to a user by expansion with movement of air by the compression;
   wherein the enclosed space is deformed upward in response to the compression part being compressed toward the enclosed space; and
   wherein the enclosed space takes on a toroidal shape in response to being deformed upward.

2. The tactile feedback device according to claim 1, wherein the compression part is provided along an edge of the tactile transmission element, and the tactile part is provided at a center of the tactile transmission element such that the tactile part is connected to the compression part.

3. The tactile feedback device according to claim 2, wherein the compression part contains a conductive material, and the tactile part contains a non-conductive material alone.

4. The tactile feedback device according to claim 3, wherein the compression part contains iron oxide ($Fe_3O_4$), and the tactile part contains silicone.

5. The tactile feedback device according to claim 1, further comprising:
   an electrode part positioned near the tactile transmission element to provide an electrostatic attractive force to the tactile transmission element; and
   a short prevention part positioned between the tactile transmission element and the electrode part to prevent a short between the tactile transmission element and the electrode part.

6. The tactile feedback device according to claim 5, further comprising:
   a case installed to house the tactile transmission element, the electrode part and the short prevention part.

7. The tactile feedback device according to claim 2, wherein an end of a central area of the tactile part is concave.

8. The tactile feedback device according to claim 6, wherein the electrode part forms a layer disposed on a surface of the case, the short prevention part forms a layer disposed on the electrode part, and a bottom edge of the compression part is disposed on the electrode part.

9. The tactile feedback device according to claim 8, wherein a wall of the case surrounds the compression part.

10. A tactile feedback device comprising:
    a tactile transmission element having an enclosed space inside, the tactile transmission element comprising
    a compression part which is compressed toward the enclosed space by an electrostatic force generated by the application of voltage, and
    a tactile part which transmits tactile sensation to a user by expansion with movement of air by the compression;
    an electrode part positioned near the tactile transmission element to provide an electrostatic attractive force to the tactile transmission element; and
    a short prevention part positioned between the tactile transmission element and the electrode part to prevent a short between the tactile transmission element and the electrode part;
    wherein
    a base of the compression part contacts the short prevention part, and a body of the compression part extends upward from the base and inward toward a center of the tactile transmission element; and
    a bottom peripheral edge of the tactile transmission element contacts an upper surface of compression part.

* * * * *